United States Patent [19]
Tanaka et al.

[11] Patent Number: 5,768,908
[45] Date of Patent: Jun. 23, 1998

[54] ADSORPTION TYPE AIR CONDITIONING USING ADSORBENT AND LIQUID REFRIGERANT

[75] Inventors: Hisashi Tanaka; Yuichi Shirota, both of Anjo; Hikaru Sugi, Nagoya, all of Japan

[73] Assignee: Nippondenso Co., Ltd., Aichi-pref., Japan

[21] Appl. No.: 723,297

[22] Filed: Sep. 30, 1996

[30] Foreign Application Priority Data

Oct. 5, 1995 [JP] Japan .................................. 7-258564

[51] Int. Cl.⁶ .................................................. F25B 17/08
[52] U.S. Cl. .............................. 62/332; 62/480; 62/239; 62/476
[58] Field of Search ........................... 62/101, 476, 480, 62/481, 239, 244, 331, 332

[56] References Cited

U.S. PATENT DOCUMENTS

| | | | |
|---|---|---|---|
| 4,199,959 | 4/1980 | Wurm | 62/480 |
| 4,700,550 | 10/1987 | Rhodes | 62/271 |
| 4,742,868 | 5/1988 | Mitani et al. | 165/104.12 |
| 4,955,205 | 9/1990 | Wilkinson | 62/94 |
| 5,222,375 | 6/1993 | Conrad et al. | 62/271 |
| 5,291,942 | 3/1994 | Ryan | 165/104.12 |
| 5,333,471 | 8/1994 | Yamada | 62/476 |
| 5,404,728 | 4/1995 | Maier-Laxhuber | 62/106 |
| 5,518,069 | 5/1996 | Maier-Laxhuber et al. | 165/104.12 |

FOREIGN PATENT DOCUMENTS 4194561 7/1992 Japan .

Primary Examiner—William C. Doerrler
Attorney, Agent, or Firm—Harness, Dickey & Pierce, PLC

[57] ABSTRACT

A desiccant tank storing desiccant is accommodated in a thermal insulation case, and a desiccant tank-side ventilation duct is formed between the desiccant tank and the thermal insulation case. Ventilation path change-over dampers are provided to switch a ventilation path of the desiccant tank-side ventilation duct to an interior heat release operation path or an exterior heat release operation path. A thermal insulation case accommodates a water tank storing water therein and connected with the desiccant tank through a connection pipe without using valves. A water tank-side ventilation duct is formed between the water tank and the thermal insulation case. Ventilation path change-over dampers are provided to switch a ventilation path of the water tank-side ventilation duct to an interior heat absorption/radiation operation path or an exterior heat absorption/radiation operation path.

10 Claims, 10 Drawing Sheets

ADSORPTION TYPE AIR CONDITIONING USING ADSORBENT AND LIQUID REFRIGERANT

BACKGROUND OF THE INVENTION

1. Field of the Invention

The present invention relates to an adsorption type air conditioning capable of air conditioning the interior of a car, utilizing heat absorption/radiation of adsorbent and vaporization heat and condensation heat of refrigerant. More particularly, it relates to an adsorption type air conditioning apparatus capable of keeping air conditioning operation even though an internal combustion engine is stopped during the stop of the car.

2. Description of Related Art

As a cooling apparatus for cooling the interior of a car, an engine-driven type air conditioning apparatus is known. This apparatus has a vapor compression type refrigerating cycle for cooling air, utilizing vaporization heat of refrigerant generated by a refrigerant evaporator provided in a duct while a refrigerant compressor is driven by an engine.

As a heating apparatus for heating the interior of the car, an engine-driven type air conditioning apparatus is known. In the heating apparatus, operation heat generated when the engine is driven is collected into engine cooling water, and the cooling water is introduced into a heater core provided in a duct so as to heat air flowing in the duct.

The above-described two engine-driven type air conditioning apparatuses operate only when the engine is driven. Therefore, at or during the stop of the car, it is necessary to drive the engine if an operator desires to have the interior of the car air conditioned.

Further, while the car is traveling, the refrigerant compressor as well as other auxiliary devices are driven by the engine to have the interior of the car air conditioned. Thus, a great load is applied to the engine. Consequently, the fuel consumption rate is increased; exhaust gas is discharged to the outside; and engine operation noise is generated.

In order to solve the above-described problems, an adsorption type air conditioning apparatus is proposed in Laid-Open Japanese Patent Publication No. 4-194561. The cooling apparatus comprises a vapor duct in which two adsorbent-accommodating tanks are connected in parallel with each other; a plurality of valves installed on the vapor duct; a heating medium circuit capable of selectively supplying the two adsorbent-accommodating tanks with engine-cooling water; a plurality of valves installed in the heating medium circuit; a cooling water circulation circuit capable of selectively supplying the two adsorbent-accommodating tanks with the engine-cooling water; and a plurality of valves installed in the cooling water circulation circuit.

In the adsorption type air conditioning apparatus, the transfer of cold or heat of adsorbent (i.e., heat absorption/radiation of adsorbent) accommodated in the adsorbent-accommodating tanks are performed by opening the valves installed in the vapor duct. That is, many parts are required to be mounted on the vapor duct, thus causing the adsorption type air conditioning apparatus to be manufactured at a high cost. Further, the entire air conditioning system requires a large space, which makes it difficult to mount the adsorption type air conditioning apparatus on the car having a limited space.

SUMMARY OF THE INVENTION

It is accordingly an object of the present invention to provide an adsorption type air conditioning capable of air conditioning the interior of a car without using an engine driven type air conditioning apparatus.

It is another object of the present invention to provide an adsorption type air conditioning apparatus having a small number of parts mounted thereon to manufacture it at a low cost and reduce an entire air conditioning system in size.

According to one aspect of the present invention, when adsorbent accommodated in an adsorbent tank is heated by an adsorbent heater, refrigerant is desorbed from the adsorbent, thus flowing from the adsorbent tank into a liquid refrigerant tank.

When a liquid refrigerant tank-side air blower is operated to allow a liquid refrigerant tank-side change-over damper to switch a ventilation path of a liquid refrigerant tank-side ventilation duct to an interior heat absorption/radiation operation path while a car is traveling, there occurs a heat exchange between vapor refrigerant which has flowed into the liquid refrigerant tank through a vapor refrigerant circuit and interior air flowing through the liquid refrigerant tank-side ventilation duct. As a result, the vapor refrigerant is condensed. At this time, the interior air flowing through the liquid refrigerant tank-side ventilation duct is heated by latent heat generated by the condensation of the vapor refrigerant generated in the liquid refrigerant tank, thus being blown to the interior of the car. In this manner, the interior of the can be cooled.

According to another aspect of the present invention, at the stop of the car, when the operation of the adsorbent heater is stopped and an adsorbent tank-side blower is operated to allow an adsorbent tank-side path change-over damper to switch a ventilation path of an adsorbent tank-side ventilation duct to an exterior heat release operation path, the adsorbent accommodated in the adsorbent tank is cooled by exterior air flowing through the adsorbent tank-side ventilation duct, thus releasing heat and continuing adsorbing the refrigerant. At this time, the latent heat generated by the condensation of the refrigerant in the desiccant tank is applied to the exterior air flowing through the desiccant tank-side ventilation duct. As a result, the heated exterior air is blown to the exterior of the car.

At the stop of the car, when the liquid refrigerant tank-side air blower is operated to allow the liquid refrigerant tank-side change-over damper to switch the ventilation path of the liquid refrigerant tank-side ventilation duct to the interior heat absorption/radiation operation path, the liquid refrigerant in the liquid refrigerant tank is evaporated by the interior air flowing through the liquid refrigerant tank-side ventilation duct. At this time, the interior air flowing through the liquid refrigerant tank-side ventilation duct is cooled by the latent heat generated by the evaporation of the refrigerant in the liquid refrigerant tank, thus being blown to the interior of the car. Accordingly, the interior of the car can be cooled without using the engine-driven type air conditioning apparatus.

According to a further aspect of the present invention, at the stop of the car, when the operation of the adsorbent heater is stopped and the adsorbent tank-side blower is operated to allow the adsorbent tank-side path change-over damper to switch the ventilation path of the adsorbent tank-side ventilation duct to an exterior heat release operation path, the adsorbent accommodated in the adsorbent tank is cooled by exterior air flowing through the adsorbent tank-side ventilation duct, thus releasing heat and continuing adsorbing the refrigerant. At this time, the interior air flowing through the adsorbent tank-side ventilation duct is heated by the latent heat generated by the condensation of the refrigerant in the adsorbent tank, thus being blown to the interior of the car. Accordingly, the interior of the car can be heated without using the engine-driven type air conditioning apparatus.

At the stop of the car, when the liquid refrigerant tank-side air blower is operated to allow the liquid refrigerant tank-side change-over damper to switch the ventilation path of the liquid refrigerant tank-side ventilation duct to the exterior heat absorption/radiation operation path, the liquid refrigerant in the liquid refrigerant tank is evaporated by the exterior air flowing through the liquid refrigerant tank-side ventilation duct. At this time, the exterior air flowing through the liquid refrigerant tank-side ventilation duct is cooled by the latent heat generated by the evaporation of the refrigerant in the liquid refrigerant tank, thus being blown to the exterior of the car.

As described above, in the adsorption type air conditioning of the present invention, cooling and heating operation of the interior of the car are not started by opening valves. The adsorption type air conditioning apparatus cools and heats the interior of the car, utilizing the phase change of refrigerant and the thermal insulation effect. Thus, the adsorption type air conditioning apparatus requires a small number of parts mounted thereon and hence can be manufactured at a low cost and in a small size.

In addition, at the stop of the car, the adsorption type air conditioning apparatus cools or heats the interior of the car without operating the engine-driven type air conditioning apparatus such as the cooling apparatus having the vapor compression type refrigerant cycle or the hot water type heating apparatus, thus reducing the fuel consumption rate. Further, a driver can have the interior of the car air conditioned without the car exhausting gas to the outside and generating an engine operation noise.

DETAILED DESCRIPTION OF THE PRESENTLY PREFERRED EMBODIMENTS

FIGS. 1 through 13 show the embodiments of the present invention.

Figure 2:
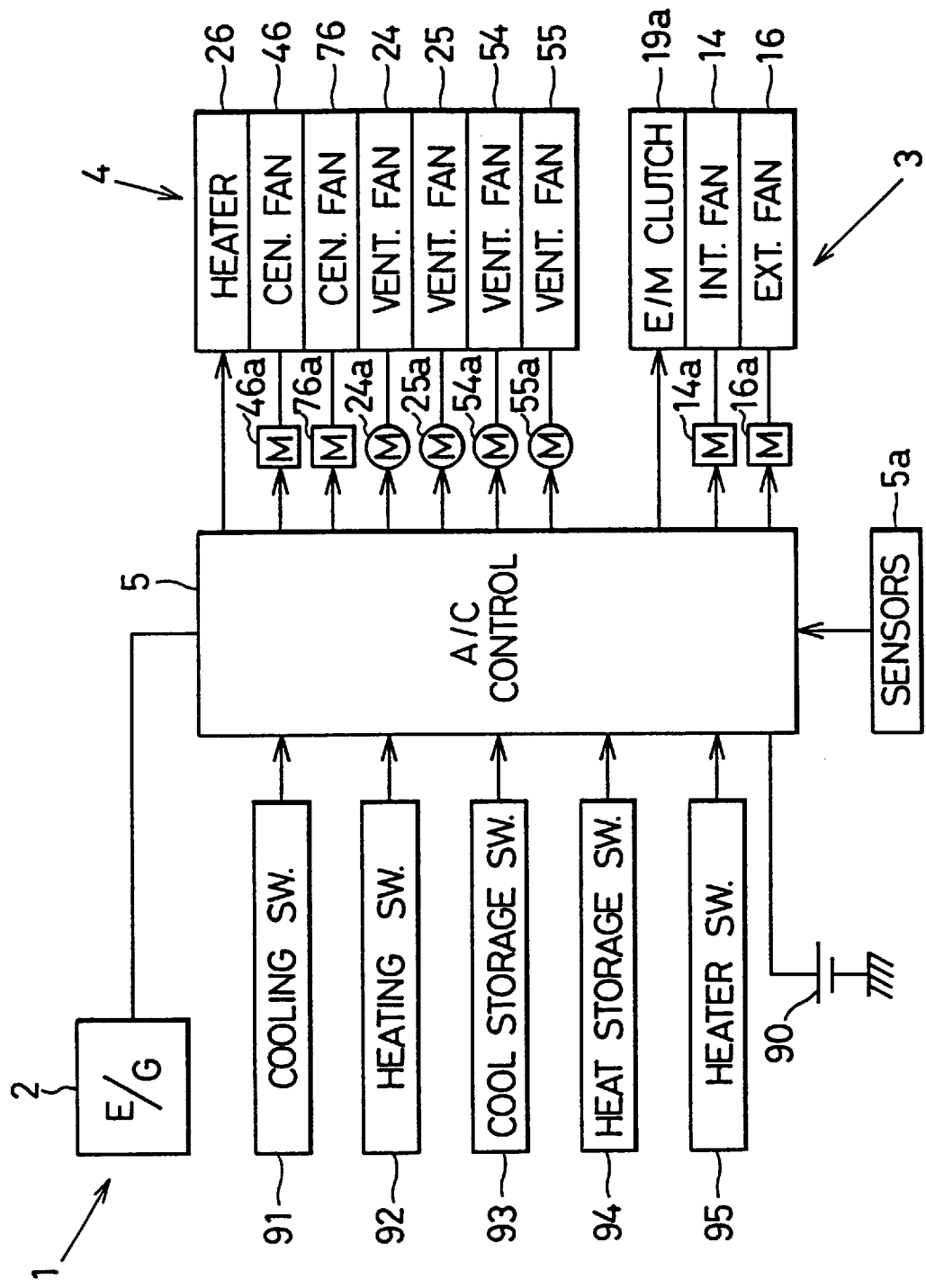
FIG. 2 is a block diagram showing an entire construction of a cold/heat storage type air conditioning apparatus.

Referring first to FIG. 2, a cold/heat storage type air conditioning system 1 for air conditioning driving the car comprises an engine-driven type air conditioning apparatus 3 (hereinafter referred to as main air conditioner 3) to be driven by an internal combustion engine 2 (hereinafter referred to as engine 2); an adsorption type air conditioning apparatus 4 provided separately from the main air conditioner 3 and operating without being driven by the engine 2; and an air conditioning controller 5 which controls the entire air conditioning system including the apparatuses 3 and 4.

In addition to driving the car, the engine 2 drives an unshown generator which charges a battery mounted on the car; an unshown water pump for circulating cooling water in an engine-cooling water circuit; and auxiliary devices such as a refrigerant compressor 19 which will be described later. The engine 2 may be replaced with an electric motor.

Figure 3:
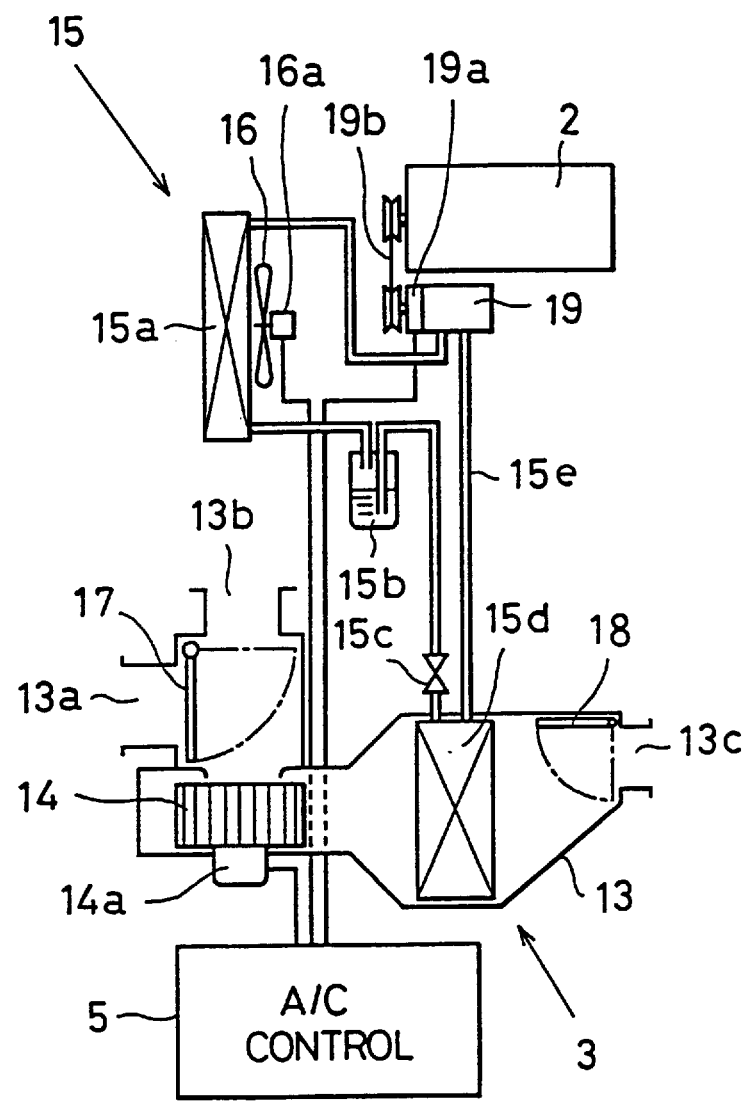
FIG. 3 is a block diagram showing a vapor compression type refrigerating cycle.

The main air conditioner 3 will be briefly described below with reference to a particular reference to FIG. 3. The main air conditioner 3 comprises a duct 13, an interior fan 14; a vapor compression type refrigerant cycle 15; and an exterior fan 16.

At the upstream side of the duct 13, there are provided an interior air suction port 13a which sucks interior air to the duct 13; an exterior air suction port 13b which sucks exterior air to the duct 13; and an interior/exterior air change-over damper 17 which opens and closes the interior air suction port 13a and the exterior air suction port 13b selectively. At the downstream side of the duct 13, there are provided an interior blowoff port 13c which blows cold air to the interior of the car and a blowoff port damper 18 which opens and closes the interior blowoff port 13c.

The interior fan 14 is rotatably mounted at the upstream side of the duct 13 and driven by a fan motor 14a.

The vapor compression type refrigerant cycle 15 has a known construction. That is, the vapor compression type refrigerant cycle 15 comprises the refrigerant compressor 19; a refrigerant condenser 15a; a vapor-liquid separator 15b such as a receiver; a pressure-reducing device 15c such as an expansion valve; a refrigerant evaporator 15d; and a looped refrigerant pipe 15e which connects operatively these members to each other. When an electromagnetic clutch 19a is energized with electric current, the power of the engine 2 is transmitted to the refrigerant compressor 19 through a belt 19b. As a result, the refrigerant compressor 19 compresses sucked refrigerant and discharges it therefrom. The exterior fan 16 blows the exterior air to the refrigerant condenser 15a. The exterior fan 16 is driven by a fan motor 16a.

The adsorption type air conditioning apparatus 4 will be briefly described below with a particular reference to FIGS. 1, 2, 4, and 6. The adsorption type air conditioning apparatus 4 comprises a vapor refrigerant circuit 6 through which vapor refrigerant (water in this embodiment) circulates; a desiccant tank-side air conditioning unit 7 accommodating one side of the vapor refrigerant circuit 6; and a water tank-side air conditioning unit 8 accommodating the other side of the vapor refrigerant circuit 6.

The vapor refrigerant circuit 6 comprises a desiccant tank 9, a water tank 10; and a connection pipe 11. A heat insulating material 12 made of resin which has a low conductivity and is used to thermally insulate the inside and the outside of the vapor refrigerant circuit 6 from each other is mounted on the periphery of the connection pipe 11.

The desiccant tank-side air conditioning unit 7 will be briefly described below with a further reference to FIG. 4. The desiccant tank-side air conditioning unit 7 comprises the desiccant tank 9 containing desiccant 20; a unit case 21 accommodating the desiccant tank 9; a centrifugal blower 23 for generating an air flow in a desiccant tank-side ventilation duct 22 formed inside the unit case 21; ventilation path change-over dampers 24 and 25 for switching the ventilation path of the desiccant tank-side ventilation duct 22 to an interior heat radiation operation path or to an exterior heat radiation operation path; and an electric heater 26 for heating the desiccant 20 accommodated in the desiccant tank 9. The desiccant 20 consists of adsorbent such as silica gel and zeolite capable of adsorbing water used as the refrigerant in this embodiment.

The desiccant tank 9 according to the present invention is made of a metallic material such as aluminum or stainless steel and has an approximately cylindrical desiccant tank body 30, the upper end of which is open and the lower end of which is closed; an approximately disc-shaped partitioning cover 31 which closes the opening of the desiccant tank body 30 at the upper end thereof; a plurality of vapor-introducing pipes 32a and 32b to be inserted into the desiccant tank body 30; and a plurality of inner fins 33a through 33c to be inserted thereinto.

A plurality of flat outer fins 33 for increasing the heat exchange performance of the desiccant tank 9 is mounted on the peripheral surface of the desiccant tank body 30. A sight window 30a for checking the charged amount of the desiccant 20 is formed on the wall of the desiccant tank body 30. The sight window 30a is closed with a transparent plate 34 made of acrylic mounted thereon by means of a screw 35a or the like through a sealing material 35 such as an O-ring. The partitioning cover 31 is mounted on the upper end of the desiccant tank body 30 by means of a clamping member such as a bolt 36a and a nut 36b through a sealing member 36 such as an O-ring. An annular member 37 is mounted on the lower end of the desiccant tank body 30 with a clamping member such as a bolt 38a and a nut 38b through a sealing member 38 such as the O-ring.

The partitioning cover 31 is made of a metallic material such as aluminum or stainless steel. The partitioning cover 31 comprises a disc-shaped portion 31a and a plurality of partitioning plates 31b extending downward from the disc-shaped portion 31a. The partitioning plates 31b partition the desiccant tank body 30 into a plurality of drying chambers. An insertion hole 31c into which an electric heater 26 is inserted is formed in each drying chamber. A joint 31d, a pressure port 31e, and a discharge pipe 31f project upward from the disc-shaped portion 31a.

The vapor-introducing pipes 32a and 32b are made of a metallic material such as aluminum or stainless steel. The vapor-introducing pipes 32a and 32b serve to allow vapor to uniformly contact the entire desiccant 20 present in the desiccant tank body 30 from the upper end thereof to the lower end thereof. The vapor-introducing pipes 32a and 32b are approximately U-shaped in section and have openings through which vapor flows, respectively. The vapor-introducing pipes 32a and 32b are made of punched metal having a large number of circular holes formed thereon. Two each of vapor-introducing pipes 32a and 32b are accommodated in each of the drying chambers of the desiccant tank body 30 partitioned from each other with a plurality of the partitioning plates 31b of the partitioning cover 31. The outer vapor-introducing pipe 32b is larger than the inner vapor-introducing pipe 32a.

A plurality of the inner fins 33a through 33c made of a metallic material such as aluminum or stainless steel has a function of increasing the heat exchange performance of the desiccant tank 9. Two each of the inner fins 33a, 33b, and 33c are accommodated in each of the drying chambers of the desiccant tank body 30 partitioned from each other with a plurality of the partitioning plates 31b of the partitioning cover 31. The outward inner fin 33c is smaller than the inward inner fin 33a and the number of the former is greater than that of the latter. A fan-shaped desiccant hold-down net 39 for preventing the flow-out of the desiccant 20 from the desiccant tank body 30 is mounted between the partitioning cover 31 and the two vapor-introducing pipes 32a and 32b as well as the three inner fins 33a through 33c to be accommodated in each drying chamber. The desiccant hold-down net 39 has a projection 39a, formed thereon, which is accommodated in the space between the periphery of each partitioning plate 31b and the inner periphery of the desiccant tank body 30.

Figure 4:
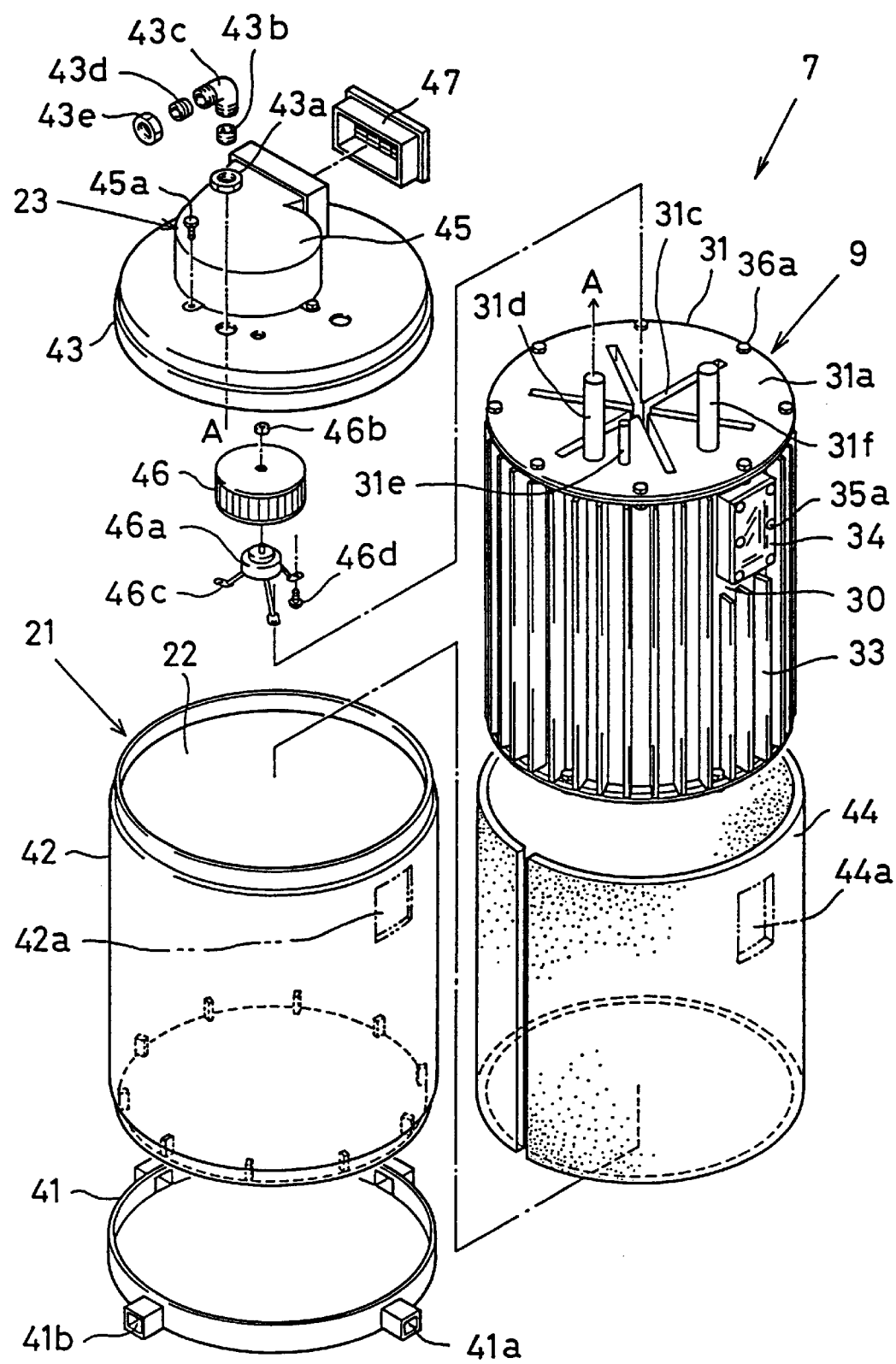
FIG. 4 is an exploded view showing an air conditioning unit at a desiccant tank side.

As shown in FIG. 4, the unit case 21 has a bottom-side case 41; a thermal insulation case 42 connected with the upper end of the bottom-side case 41; and a ceiling-side case 43 for closing the opening of the thermal insulation case 42.

Figure 1:
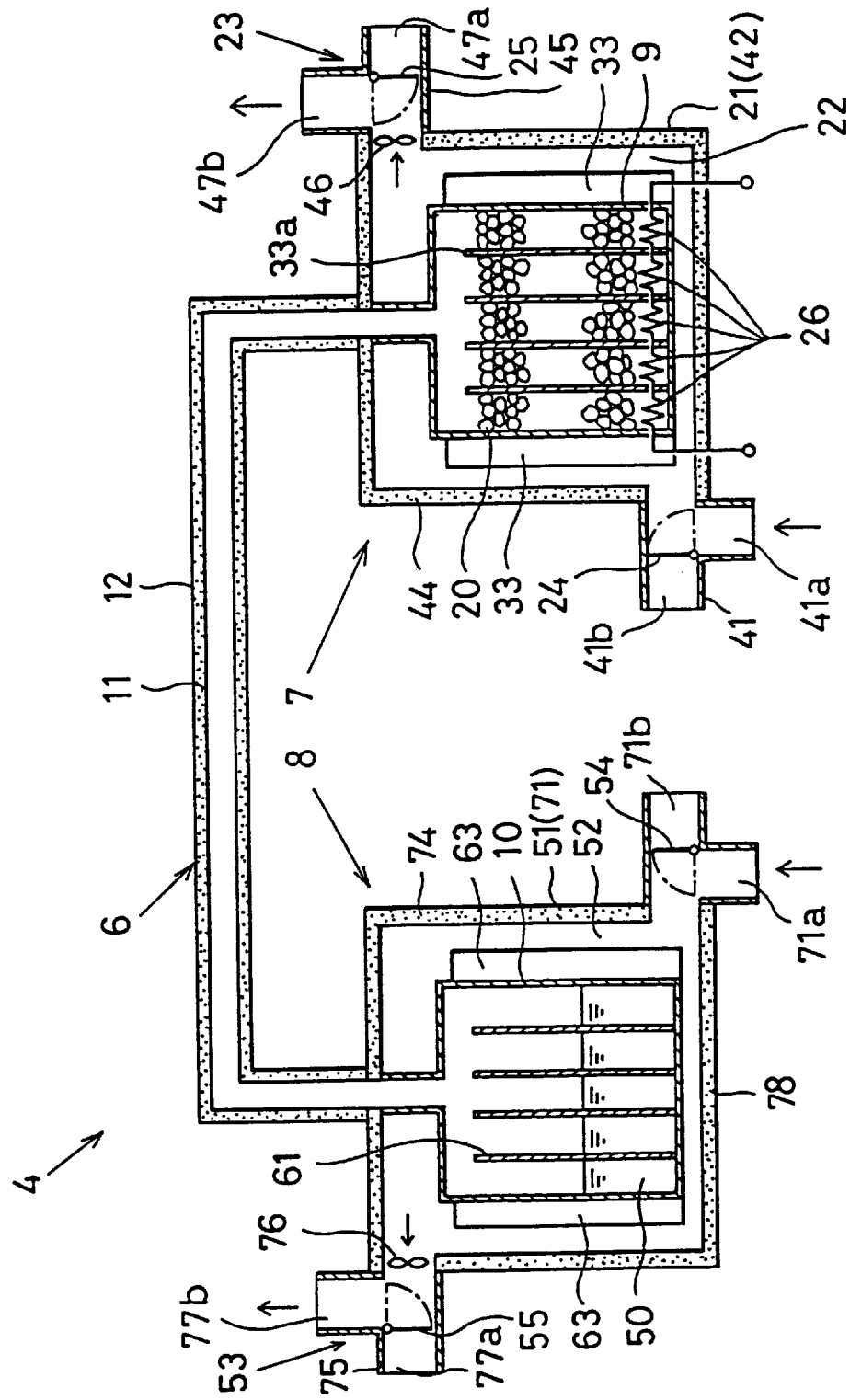
FIG. 1 is a view schematically showing an adsorption type air conditioning apparatus according to an embodiment of the present invention.

The bottom-side case 41 is made of a metallic material such as aluminum or stainless steel and is ring-shaped. The ventilation path change-over damper 24 is rotatably mounted inside the bottom-side case 41, as shown in FIG. 1. On the bottom-side case 41, two interior air suction ports 41a for sucking interior air to the desiccant tank-side ventilation duct 22 and two exterior air suction ports 41b for sucking the exterior air thereto are formed.

The thermal insulation case 42 is cylindrical and made of a metallic material such as aluminum or stainless steel, thus accommodating the desiccant tank 9. The cylindrical space between the desiccant tank 9 and the thermal insulation case 42 is formed as the desiccant tank-side ventilation duct 22. A sight window 42a is formed on the wall of the thermal insulation case 42 at a position corresponding to the position of the sight window 30a of the desiccant tank body 30. A thermal insulation material 44 made of resin which has a low thermal conductivity and is used to thermally insulate the inside and outside of the thermal insulation case 42 from each other is mounted on the periphery thereof. A sight window 44a is also formed on the wall of the thermal insulation material 44 at a position corresponding to the position of the sight window 30a of the desiccant tank body 30.

The ceiling-side case 43 has joint units 43a through 43e for connecting with each other the right end of the connection pipe 11 shown in FIG. 1 and the upright joint 31d integral with the partitioning cover 31. The ceiling-side case 43 is disc-shaped to close the opening of the thermal insulation case 42 at the upper end thereof and has an unshown communication opening communicating with the centrifugal blower 23. The joint 31d and the joint units 43a through 43e constitute a coupling joint for connecting the desiccant tank 9 and the water tank 10 with each other through the connection pipe 11.

The centrifugal blower 23 comprises a scroll casing 45; a centrifugal fan 46 rotating in the scroll casing 45; and an electric motor 46a which drives the centrifugal fan 46. The scroll casing 45 is fixed to the ceiling-side case 43 by means of a clamping member such as a bolt 45a and a nut.

The centrifugal fan 46 is mounted on the electric motor 46a by means of a clamping member such as a nut 46a and bolt. The electric motor 46a is fixed to the ceiling-side case 43 by means of a clamping member such as a bolt 46d and nut through a mounting stay 46c. As shown in FIG. 1, at the discharge side of the scroll casing 45, there are formed an interior blowoff port 47a from which an air flow is blown toward the interior of the car and an exterior blowoff port 47b from which an air flow is blown out toward the exterior of the car. As shown in FIG. 4, the interior blowoff port 47a has a grill 47 formed thereon. As shown in FIG. 1, the ventilation path change-over damper 25 is rotatably provided at the upstream side of the interior blowoff port 47a and the exterior blowoff port 47b.

Referring to FIG. 1, the ventilation path change-over damper 24 selectively opens and closes the two interior air suction ports 41a and the two exterior air suction port 41b. The ventilation path change-over damper 24 is driven by a servo motor 24a.

In cooperation with the operation of the ventilation path change-over damper 24, the ventilation path change-over damper 25 selectively opens and closes the interior air discharge port 47a and the exterior air discharge port 47b. The ventilation path change-over damper 25 is driven by a servo motor 25a.

Figure 5:
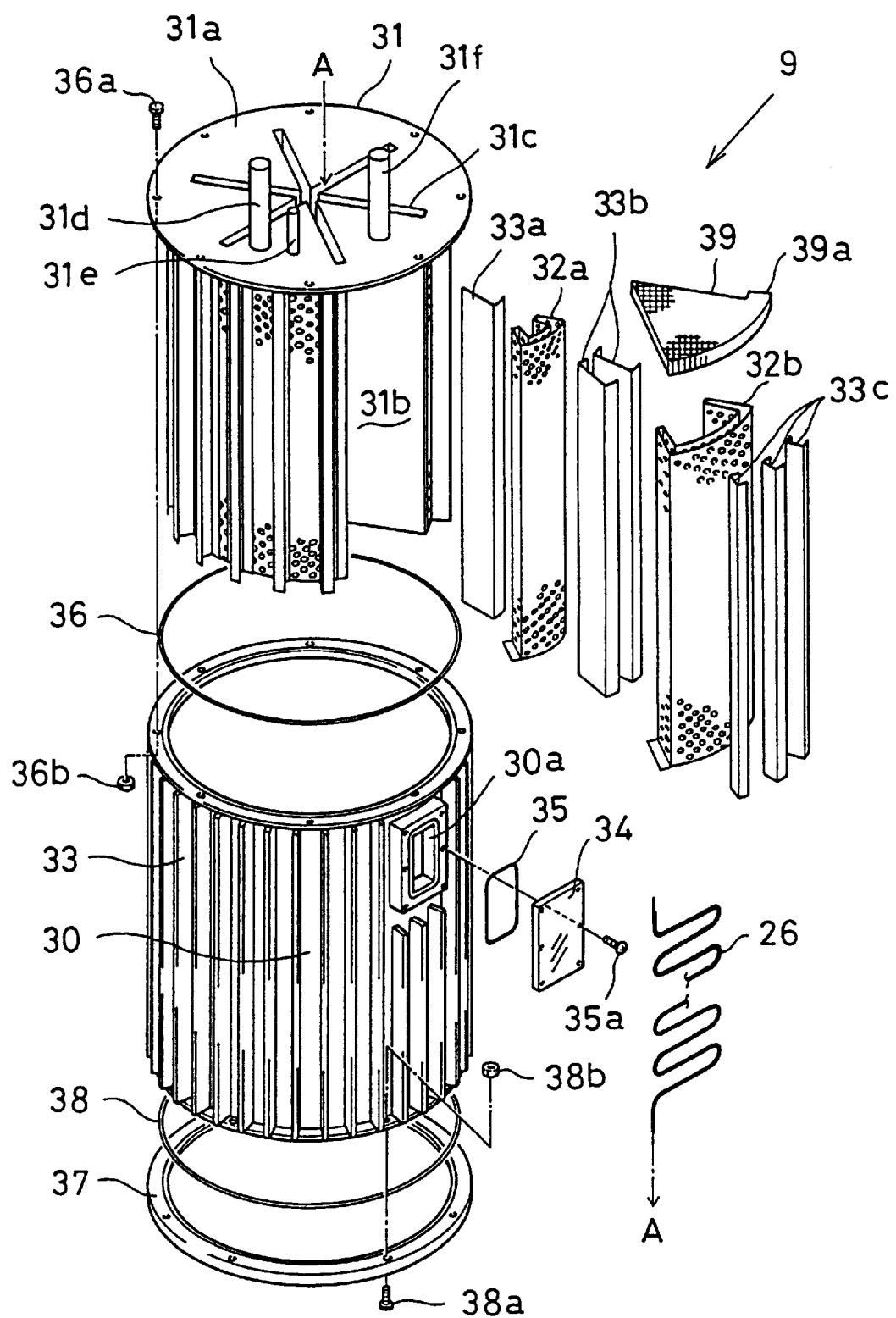
FIG. 5 is an exploded view showing a desiccant tank.

Referring to FIGS. 1 and 5, a plurality of the zigzag electric heaters 26 each uses a micro-heater. Each electric heater 26 is inserted into each of the insertion holes 31c of the partitioning cover 31 for heating the desiccant 20, as shown in FIG. 5. The electric heater 26 generates heat when electric current flows therethrough. Electric heaters such as a PTC heater may be used as the electric heater 26.

The water tank-side air conditioning unit 8 according to the embodiment will be briefly described below with reference to FIGS. 1 and 6. The water tank-side air conditioning unit 8 comprises the water tank 10 for storing water 50 to be used as refrigerant; a unit case 51 accommodating the water tank 10; a centrifugal blower 53 for generating an air flow in a water tank-side ventilation duct 52 formed in the unit case 51; and ventilation path change-over dampers 54 and 55 for switching the ventilation path of the water tank-side ventilation duct 52 to an interior cold/heat radiation operation path or to an exterior cold/heat radiation operation path.

The water tank 10 is made of a metallic material such as aluminum or stainless steel and has an approximately rectangular cylindrical water tank body 60, the upper end of which is open and the lower end of which is closed; an approximately rectangular ceiling plate 61 which closes the opening of the water tank body 60 at the upper end thereof; and a plurality of inner fins 62 to be inserted into the water tank body 60.

A plurality of flat outer fins 63 (see FIG. 1) for increasing the heat exchange performance of the water tank 10 is mounted on the peripheral surface of the water tank body 60. A sight window 60a for observing the charged amount of the water 50 is formed on a side wall of the water tank body 60. The sight window 60a is closed with a transparent plate 64 made of acrylic mounted thereon by means of a clamping member such as a bolt 65a and nut through a sealing member 65 such as an O-ring. A ceiling plate 61 is mounted on the upper end of the water tank body 60 with a clamping member such as a bolt 66a through a sealing material 66 such as an O-ring.

The ceiling plate 61 is made of a metallic material such as aluminum or stainless steel. A joint 61d, a pressure port 61e, and a water supply port 61f project upward from the upper end of the ceiling plate 61. The joint 61d is connected with the left end of the connection pipe 11 in FIG. 1 through joint units 67a through 67e. The joint 61d and the joint units 67a through 67e constitute a coupling joint for connecting the water tank 10 and the desiccant tank 9 with each other through the connection pipe 11.

A plurality of the inner fins 62 for increasing the heat exchange performance of the water tank 10 is approximately Z-shaped and made of a metallic material such as aluminum or stainless steel. The inner fins 62 are arranged in columns inside the water tank body 60.

Figure 6:
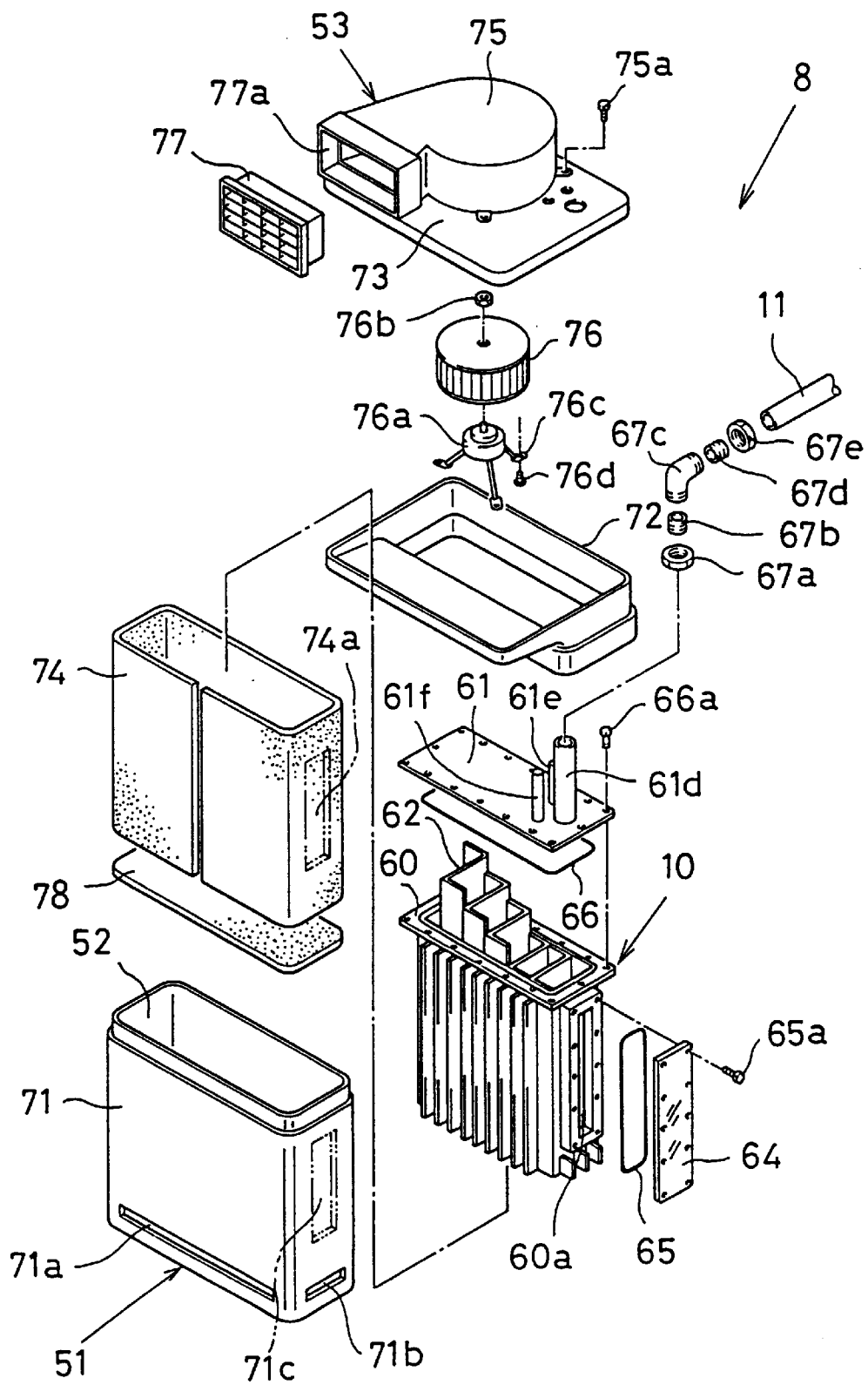
FIG. 6 is an exploded view showing an air conditioning unit at a water tank side.

As shown in FIG. 6, the unit case 51 has a thermal insulation case 71; a connection case 72 to be connected with the upper end of the thermal insulation case 71; and a ceiling-side case 73 for closing the opening of the connection case 72.

The thermal insulation case 71 is made of a metallic material such as aluminum or stainless steel and is approximately rectangular cylindrical. The ventilation path change-over damper 54 is rotatably mounted at a lower portion of the thermal insulation case 71, as shown in FIG. 1. Two interior air suction ports 71a for sucking the interior air to the water tank-side ventilation duct 52 and two exterior air suction ports 71b for sucking the exterior air thereto are formed at a lower portion of the thermal insulation case 71.

The thermal insulation case 71 accommodates the water tank 10. The cylindrical space between the thermal insulation case 71 and the water tank 10 is formed as the water tank-side ventilation duct 52. A sight window 71c is formed on a side wall of the thermal insulation case 71 at a position corresponding to the position of the sight window 60a of the water tank body 60. Thermal insulation members 74 and 78 made of resin having a low thermal conductivity to thermally insulate the inside and outside of the thermal insulation case 71 from each other are mounted on the periphery thereof. A sight window 74a is also formed on the wall of the thermal insulation member 74 at a position corresponding to the position of the sight window 60a of the water tank body 60.

The ceiling-side case 73 is rectangular to close the opening of the thermal insulation case 71 at the upper end thereof and has an unshown communication opening communicating with the centrifugal blower 53.

The centrifugal blower 53 comprises a scroll casing 75; a centrifugal fan 76 rotating in the scroll casing 75; and an electric motor 76a which drives the centrifugal fan 76. The scroll casing 75 is fixed to the ceiling-side case 73 by means of a clamping tool such as a bolt 75a and nut.

The centrifugal fan 76 is mounted on the electric motor 76a by means of a clamping tool such as a nut 76b and bolt. The electric motor 76a is fixed to the ceiling-side case 73 by means of a clamping tool such as a bolt 76d and nut through a mounting stay 76c. As shown in FIG. 1, at the discharge side of the scroll casing 75, there are formed an interior blowoff port 77a from which an air flow is blown toward the interior of the car and an exterior blowoff port 77b from which an air flow is blown out toward the exterior of the car. As shown in FIG. 6, a grill 77 is installed on the interior blowoff port 77a. As shown in FIG. 1, the ventilation path change-over damper 55 is rotatably provided at the upstream side of the interior blowoff port 77a and the exterior blowoff port 77b.

Referring to FIG. 1, the ventilation path change-over damper 54 opens and closes the two interior air suction ports 71a and the two exterior air suction ports 71b selectively. The ventilation path change-over damper 54 is driven by a servo motor 54a.

Referring to FIG. 1, in cooperation with the operation of the ventilation path change-over damper 54, the ventilation path change-over damper 55 opens and closes the interior air suction ports 77a and the exterior air suction ports 77b selectively. The ventilation path change-over damper 55 is driven by a servo motor 55a.

Referring to FIG. 2, the air conditioning controller 5 is a microcomputer having a CPU, a ROM, and a RAM and operates upon receipt of electric power from a battery 90. Based on instruction signals outputted from instruction switches 91 through 95 and signals detected by sensors 5a, the air conditioning controller 5 controls the fan motor 14a of the exterior fan 14, the fan motor 16a of the interior fan 16, the electromagnetic clutch 19a of the refrigerant compressor 19, the servo motor 24a of the ventilation path change-over damper 24, the servo motor 25a of the ventilation path change-over damper 25, the electric heater 26, the electric motor 46a of the centrifugal fan 46, the servo motor 54a of the ventilation path change-over damper 54, the servo motor 55a of the ventilation path change-over damper 55, and the electric motor 76a of the centrifugal fan 76.

In this embodiment, the instruction switches includes a cooling switch 91 for instructing the actuation and stop of a cooling operation, a heating switch 92 for instructing the actuation and stop of the heating operation, a cool storage switch 93 for instructing the actuation and stop of a cool storage operation, a heat storage switch 94 for instructing the actuation and stop of a heat storage operation, and a heater switch 95 for instructing the actuation and stop of the electric heater 26. The sensors 5a include a temperature adjusting switch for temperature setting, interior air temperature sensor for interior air temperature detection, exterior air temperature sensor for exterior air temperature detection, and a temperature sensor positioned in the rear of the refrigerant evaporator 15d.

The operation of the adsorption type air conditioning apparatus 1 according to the embodiment is described below.
(Moisture Desorbing Operation During Travel of Car)

Figure 7:
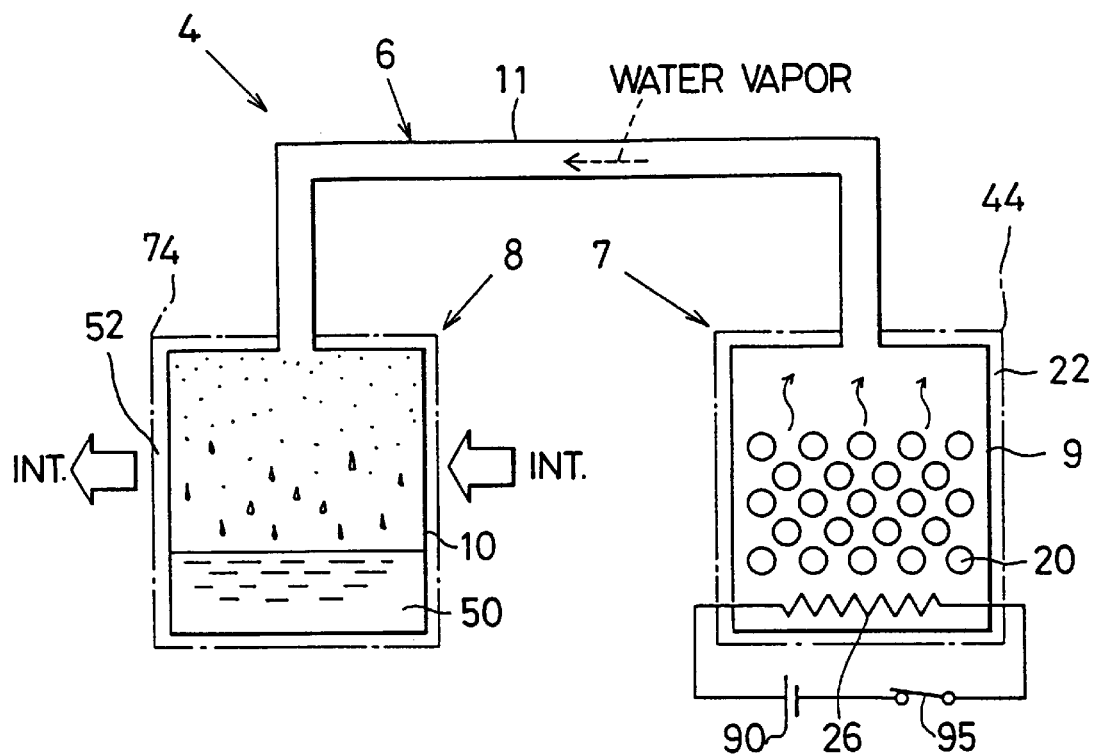
FIG. 7 is an explanatory view showing an operation of the adsorption type air conditioning apparatus.

FIG. 7 is an explanatory view showing the outline of a water desorbing or purging operation (cooling operation) of the adsorption type air conditioning apparatus 4 to be performed during the travel of the car. When a cooling operation is indicated by turning on the cooling switch 91 and the heater switch 95 when the car is traveling, i.e., when the engine 2 is in operation, or when the temperature of the interior air is higher than that set by the temperature-adjusting switch, both the main air conditioner 3 and the adsorption type air conditioning apparatus 4 are actuated.

That is, the electromagnet switch 19a of the refrigerant compressor 19, the fan motor 14a of the interior fan 14, the fan motor 16a of the exterior fan 16, the electric motor 46a of the centrifugal fan 46, and a plurality of the electric heaters 26 are turned on. Further, the ventilation path of the water tank-side ventilation duct 52 is switched to an interior heat absorption/radiation path by controlling the servo motor 54a of the ventilation path change-over damper 54 and the servo motor 55a of the ventilation path change-over damper 55.

The interior heat absorption/radiation operation path means a ventilation path for circulating the interior air in the interior of the car through the interior air suction port 71a of the thermal insulation case 71→the water tank-side ventilation duct 52 between the water tank 10 and the thermal insulation case 71→the space inside the ceiling-side case 73→the space inside the scroll casing 75→the interior blowoff port 77a of the scroll casing 75.

Accordingly, due to the actuation of the vapor compression type refrigerant cycle 15, refrigerant which has flowed into the refrigerant evaporator 15d positioned inside the duct 13 cools air flowing through the duct 13. The cooled air is blown from the interior blowoff port 13c to the interior of the car, thus cooling the interior of the car. If the temperature set by the temperature-adjusting switch is 25° C., the vapor compression type refrigerant cycle 15 operates so that the temperature of the interior air is 25° C.

In the adsorption type air conditioning apparatus 4, the centrifugal fan 46 is not in operation. Therefore, an air flow is not generated in the desiccant tank-side ventilation duct 22 and thus the desiccant tank 9 is not cooled. At this time, the desiccant 20 consisting of silica gel or zeolite in the desiccant tank 9 is heated by the electric heater 26. For example, silica gel is heated to 100° C.–150° C. Consequently, moisture is desorbed from the desiccant 20 and vapor rises upward in the desiccant tank 9 through the vapor-introducing pipes 32a and 32b, thus flowing into the water tank 10 through the connection pipe 11.

At the water tank side, the centrifugal fan 76 operates, and the ventilation path of the water tank-side ventilation duct 52 is switched to the interior heat absorption/radiation path by the ventilation path change-over dampers 54 and 55. Therefore, there occurs a heat exchange between vapor which has flowed into the water tank 10 through the connection pipe 11 and the interior air flowing through the water tank-side ventilation duct 52. As a result, the vapor is condensed. At this time, the interior air flowing through the water tank-side ventilation duct 52 is heated by latent heat generated by the condensation of the vapor in the water tank 10. As a result of the heat exchange between the vapor in the water tank 10 and the interior air of 25° C., the interior air (cool air) of 28° C. is blown to the interior of the car. Accordingly, the air in the interior of the car is cooled by the simultaneous operation of the main air conditioner 3 and the adsorption type air conditioning apparatus 4.
(Cold Storage Operation During Travel of Car)

Figure 8:
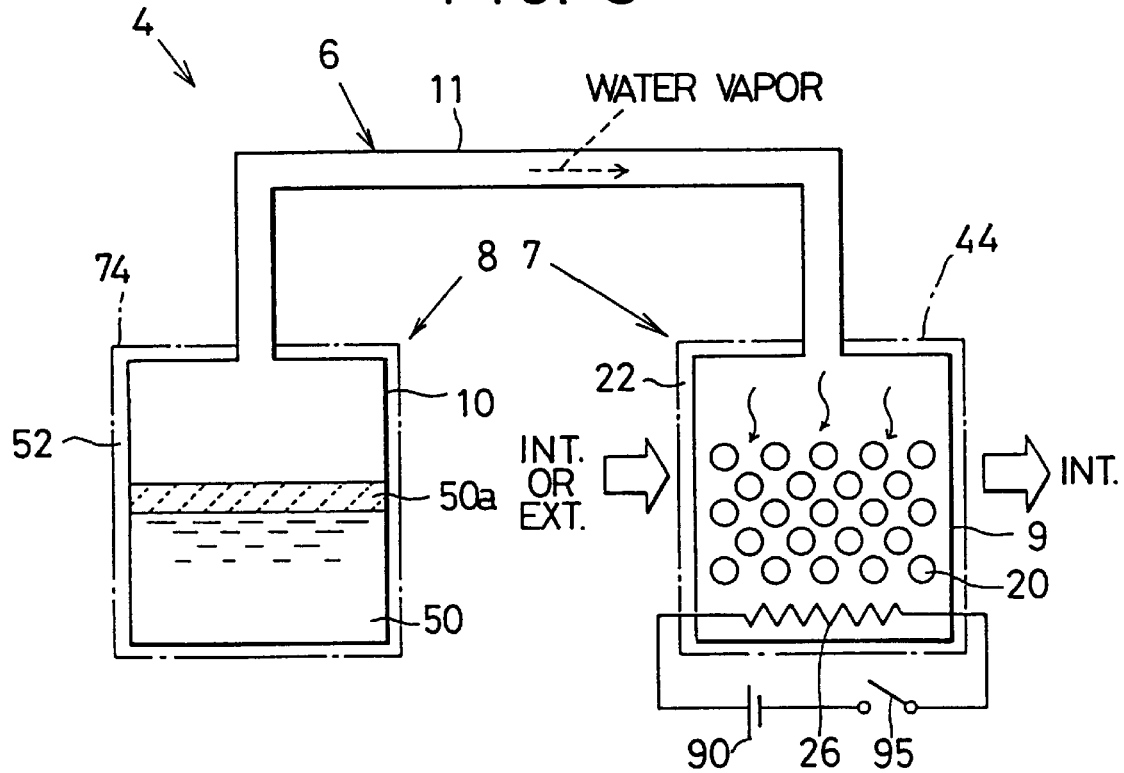
FIG. 8 is an explanatory view showing an operation of the adsorption type air conditioning apparatus.

FIG. 8 is an explanatory view showing the outline of a cold storage operation of the adsorption type air conditioning apparatus 4 to be performed during the travel of the car. When the cold storage operation is instructed by turning on the cold storage switch 93 while a cooling operation is being performed during the travel of the car, i.e., when the engine 2 is in operation, the main air conditioner 3 operates in a manner similar to that of the above-described cooling operation, whereas the adsorption type air conditioning apparatus 4 operates as described below.

That is, the electric motor 46a of the centrifugal fan 46 is turned on, whereas a plurality of the electric heaters 26 and the electric motor 76a of the centrifugal fan 76 are turned off. Further, the ventilation path of the desiccant tank-side ventilation duct 22 is switched to an interior cold storage operation path by controlling the servo motor 24a of the ventilation path change-over damper 24 and the servo motor 25a of the ventilation path change-over damper 25.

The interior cold storage operation path means a ventilation path for circulating the interior air in the interior of the car or introducing the exterior air thereinto through the interior air suction port 41a of the bottom-side case 41 or the exterior air suction port 41b thereof→the desiccant tank-side ventilation duct 22 between the desiccant tank 9 and the thermal insulation case 42→the communication port of the ceiling-side case 43→the space inside the scroll casing 45→the interior blowoff port 47a of the scroll casing 45.

Accordingly, the desiccant 20 inside the desiccant tank 9 is cooled by the interior air (for example, 25° C.) flowing through the desiccant tank-side ventilation duct 22 or the exterior air flowing therethrough, thus releasing heat. Thus, there occurs a heat exchange between the refrigerant in the desiccant tank 9 and the interior air 25° C. or the exterior air. As a result, the temperature of the interior air or the exterior air is raised from 25° C. to 28° C. Consequently, the desiccant 20 continues adsorbing the refrigerant, and the water in the water tank 10 evaporates. As a result, the water in the water tank 10 is rapidly cooled.

The water 50 in the water tank 10 is turned into ice 50a due to the rapid cooling because the water tank 10 is thermally insulated by the thermal insulation case 71. The evaporation rate of the water is suppressed by the formation of ice (sublimation rate of ice<<evaporation rate of water.) Thus, the state of the refrigerant in the vapor refrigerant circuit 6 is stable, i.e., the temperature thereof is kept at a constant temperature. In this manner, the cold storage operation is completed. The desiccant 20 is kept to be cooled to the temperature of the interior air (interior temperature: for example, 25° C.) or that of the exterior air kept to flow through the desiccant tank-side ventilation duct 22 by the operation of the centrifugal fan 46.

(Heat Absorption Operation During Stop of Car)

Figure 9:
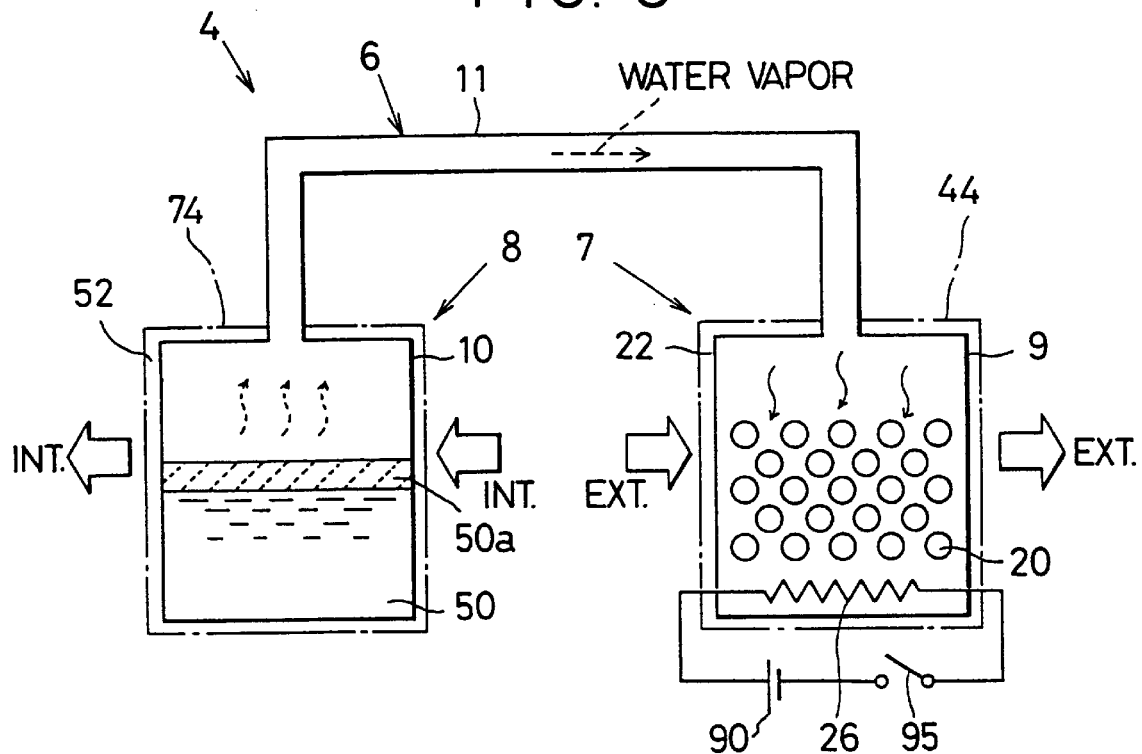
FIG. 9 is an explanatory view showing an operation of the adsorption type air conditioning apparatus.

FIG. 9 is an explanatory view showing the outline of a heat absorption operation (e.g., cooling operation by ice melting) of the adsorption type air conditioning apparatus 4 to be performed at the stop of the car. When a cooling operation is instructed by turning on the cooling switch 91 at the stop of the car, namely, during the stop of the engine 2, the main air conditioner 3 is stopped by the engine, whereas the adsorption type air conditioning apparatus 4 operates as described below.

That is, the electric motor 46a of the centrifugal fan 46 and the electric motor 76a of the centrifugal fan 76 are turned on, whereas the electric heater 26 is turned off. Further, the ventilation path of the desiccant tank-side ventilation duct 22 is switched to an exterior heat release operation path by controlling the servo motor 24a of the ventilation path change-over damper 24 and the servo motor 25a of the ventilation path change-over damper 25. Moreover, the ventilation path of the water tank-side ventilation duct 52 is switched to the interior heat absorption/radiation operation path by controlling the servo motor 54a of the ventilation path change-over damper 54 and the servo motor 55a of the ventilation path change-over damper 55.

The exterior heat release operation path means a ventilation path for circulating the exterior air in the exterior of the car through the exterior air suction port 41b of the bottom-side case 41→the desiccant tank-side ventilation duct 22 between the desiccant tank 9 and the thermal insulation case 42→the communication port of the ceiling-side case 43→the space inside the scroll casing 45→the exterior blowoff port 47b of the scroll casing 45.

The interior heat absorption/radiation operation path means a ventilation path for circulating the interior air in the interior of the car through the interior air suction port 71a of the thermal insulation case 71→the water tank-side ventilation duct 52 between the water tank 10 and the thermal insulation case 71→the space inside the ceiling-side case 73→the space inside scroll casing 75→the interior blowoff port 77a of the scroll casing 75.

At the desiccant tank side, the centrifugal fan 46 is operated to cool the desiccant 20 inside the desiccant tank 9 by the exterior air flowing through the desiccant tank-side ventilation duct 22. As a result, the desiccant 20 release heat, thereby continuing adsorbing the refrigerant. At this time, latent heat generated by the condensation of the refrigerant in the desiccant tank 9 is applied to the exterior air flowing through the desiccant tank-side ventilation duct 22. As a result, the exterior air is heated and blown to the exterior of the car. For example, the temperature of the exterior air is raised from 30° C. to 35° C. as a result of the heat exchange between the exterior air and the refrigerant in the desiccant tank 9.

At the water tank side, the centrifugal fan 76 is operated. As a result, the water in the water tank 10 is evaporated by the interior air flowing through the water tank-side ventilation duct 52. At this time, the interior air flowing through the water tank-side ventilation duct 52 is cooled by latent heat generated by the evaporation of the refrigerant in the water tank 10, thus being blown to the interior of the car and absorbing heat. For example, the interior air of 28° C. is reduced to 15° C. as a result of the heat exchange between the interior air and the vapor in the water tank 10. Accordingly, the interior of the car can be cooled without using the main air conditioner 3.

(Moisture Desorbing Operation During Travel of Car)

Figure 10:
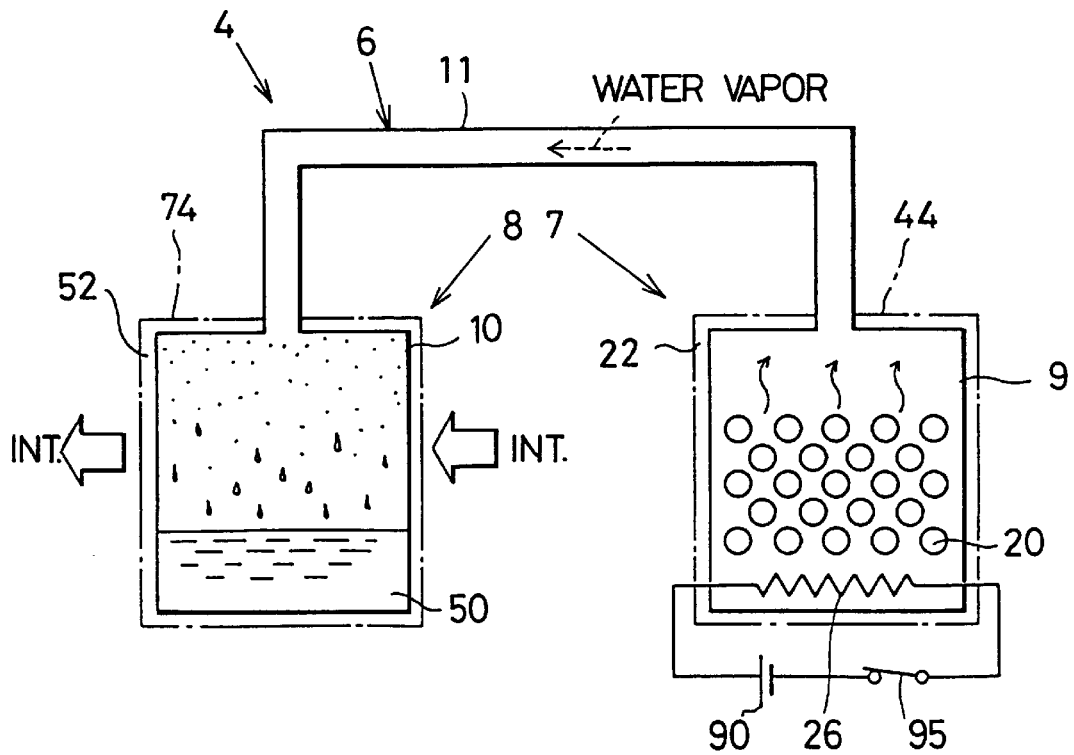
FIG. 10 is an explanatory view showing an operation of the adsorption type air conditioning apparatus.

FIG. 10 is an explanatory view showing the outline of a water desorbing or purging operation (heating operation) of the adsorption type air conditioning apparatus 4 to be performed during the travel of the car. When a heating operation is indicated by turning on the heating switch 92 and the heater switch 95 when the car is traveling, i.e., when the engine 2 is in operation or when the temperature of the interior air is lower than that set by the temperature-adjusting switch, only the adsorption type air conditioning apparatus 4 is actuated.

That is, the electric motor 46a of the centrifugal fan 46 and a plurality of the heaters 26 are turned on. Further, the ventilation path of the water tank-side ventilation duct 52 is switched to an interior heat absorption/radiation operation path by controlling the servo motor 54a of the ventilation path change-over damper 54 and the servo motor 55a of the ventilation path change-over damper 55.

Similarly to the moisture-desorbing operation in the cooling operation during the travel of the car, the desiccant 20 in the desiccant tank 9 is heated by the electric heater 26. As a result, moisture is desorbed from the desiccant 20. At the same time, there occurs a heat exchange between the vapor in the water tank 10 and the interior air flowing through the water tank-side ventilation duct 52. As a result, the vapor is condensed. At this time, the interior air flowing through the water tank-side ventilation duct 52 is heated by latent heat generated by the condensation of the vapor in the water tank 10. For example, as a result of the heat exchange between the vapor in the water tank 10 and the interior air of 25°, the temperature of the interior air is raised from 25° C. to 28° C. Accordingly, the interior of the car is heated by the operation of the only the adsorption type air conditioning apparatus 4.

(Heat Storage Operation During Travel of Car)

Figure 11:
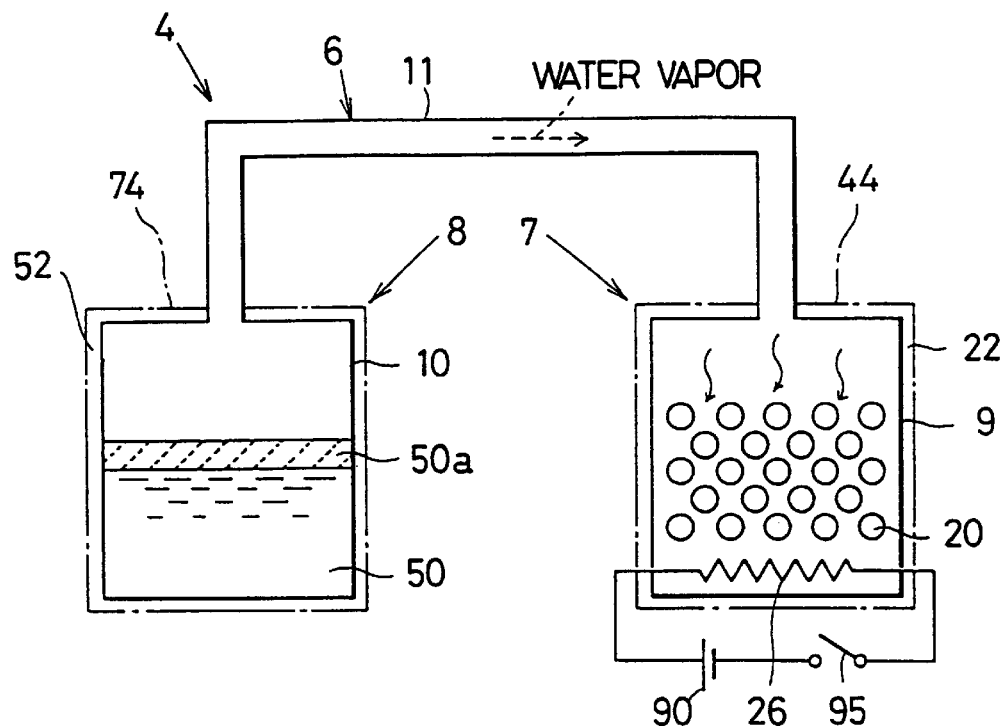
FIG. 11 is an explanatory view showing an operation of the adsorption type air conditioning apparatus.

FIG. 11 is an explanatory view showing the outline of a heat storage operation of the adsorption type air conditioning apparatus 4 to be performed during the travel of the car. When a heat storage operation is instructed by turning on the heat storage switch 94 during the travel of the car, i.e., when the engine 2 is in operation, only the adsorption type air conditioning apparatus 4 operates as described below.

That is, a plurality of the electric heaters 26, the electric motor 46a of the centrifugal fan 46, and the electric motor 76a of the centrifugal fan 76 are turned off.

Thus, when the electric heaters 26 in the desiccant tank 9 are turned off to allow the desiccant 20 to start to adsorb moisture. At this time, because the interior air does not flow through the desiccant tank-side ventilation duct 22, the desiccant 20 performs only a moisture-adsorbing operation, unlike in the cooling operation. That is, when the desiccant 20 consists of silica gel, a physical adsorption is performed. Thus, latent heat (for example, 580 kcal/kg) is generated by the condensation of vapor. Thereafter, the water in the water tank 10 is cooled rapidly owing to the evaporation of the water therein caused by the moisture adsorption of the desiccant 20.

The water in the water tank 10 is turned into ice due to the rapid cooling, because the water tank 10 is securely thermally insulated by the thermal insulation case 71. Therefore, the state of the refrigerant in the vapor refrigerant circuit 6 is stable owing to the latent heat generated by the condensation of the vapor caused by the moisture-adsorption of the desiccant 20 and the temperature in the desiccant tank 9 settled after the turn-off of the electric heater 26. Therefore, the refrigerant in the vapor refrigerant circuit 6 is kept at a constant temperature. In this manner, the heat storage operation is completed.

(Heat Release Operation to be Performed When Car is at Stop)

Figure 12:
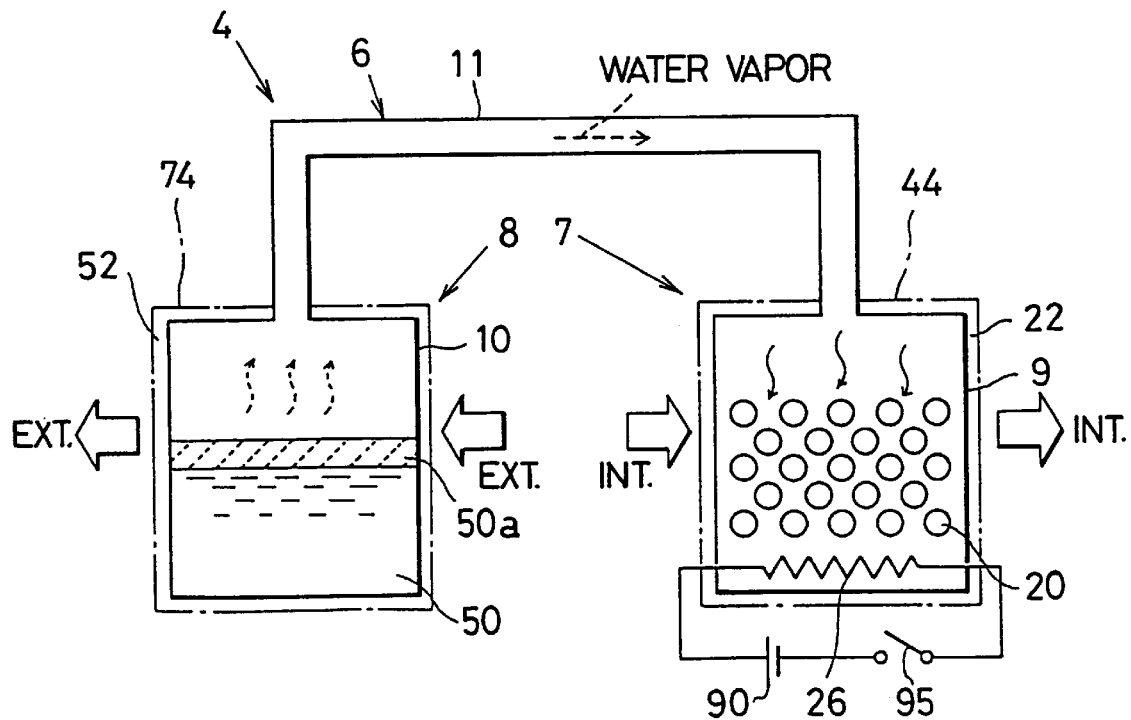
FIG. 12 is an explanatory view showing an operation of the adsorption type air conditioning apparatus.

FIG. 12 is an explanatory view showing the outline of a heat release operation (heating operation) of the adsorption type air conditioning apparatus 4 to be performed at the stop of the car. When a heating operation is instructed by turning on the heating switch 92 at the stop of the car, i.e., when the engine 2 is at a stop, only the adsorption type air conditioning apparatus 4 operates as described below.

That is, the electric motor 46a of the centrifugal fan 46 and the electric motor 76a of the centrifugal fan 76 are turned on, whereas the electric heater 26 is turned off. Further, the ventilation path of the desiccant tank-side ventilation duct 22 is switched to the interior heat release operation path by controlling the servo motor 24a of the ventilation path change-over damper 24 and the servo motor 25a of the ventilation path change-over damper 25. Further, the ventilation path of the water tank-side ventilation duct 52 is switched to the exterior heat absorption/radiation operation path by controlling the servo motor 54a of the ventilation path change-over damper 54 and the servo motor 55a of the ventilation path change-over damper 55.

The interior heat release (radiation) operation path means a ventilation path for circulating the interior air in the interior of the car through the interior air suction port 41a of the bottom-side case 41→the desiccant tank-side ventilation duct 22 between the desiccant tank 9 and the thermal insulation case 42→the communication port of the ceiling-side case 43→the space inside the scroll casing 45→the interior blowoff port 47a of the scroll casing 45.

The exterior heat absorption/radiation operation path means a ventilation path for circulating the exterior air in the interior of the car through the exterior air suction port 71b of the thermal insulation case 71→the water tank-side ventilation duct 52 between the water tank 10 and the thermal insulation case 71→the space inside the ceiling-side case 73→the space inside scroll casing 75→the exterior blowoff port 77b of the scroll casing 75.

At the desiccant tank side, when the centrifugal fan 46 is operated to cool the desiccant 20 inside the desiccant tank 9 by the interior air flowing through the desiccant tank-side ventilation duct 22. As a result, the desiccant 20 releases heat, thereby continuing adsorbing the refrigerant. At this time, the temperature of the interior air flowing through the desiccant tank-side ventilation duct 22 is raised by latent heat generated by the condensation of the refrigerant in the desiccant tank 9. Thereafter, the interior air (warm air) is blown to the interior of the car. For example, the temperature of the interior air is raised from 30° C. to 35° C. as a result of the heat exchange between the refrigerant in the desiccant tank 9 and the interior air flowing through the desiccant tank-side ventilation duct 22. In this manner, the interior of the car can be heated without using the main air conditioner 3.

At the water tank side, when the centrifugal fan 76 is operated, the water in the water tank 10 is evaporated by the exterior air flowing through the water tank-side ventilation duct 52. At this time, the exterior air flowing through the water tank-side ventilation duct 52 is cooled by latent heat generated by the evaporation of the refrigerant in the water tank 10. For example, the temperature of the interior air is reduced from 5° C. to 2° C. as a result of the heat exchange between the vapor in the water tank 10 and the exterior air flowing through the water tank-side ventilation duct 52. Thereafter, the cooled air is blown to the exterior of the car.

Figure 13:
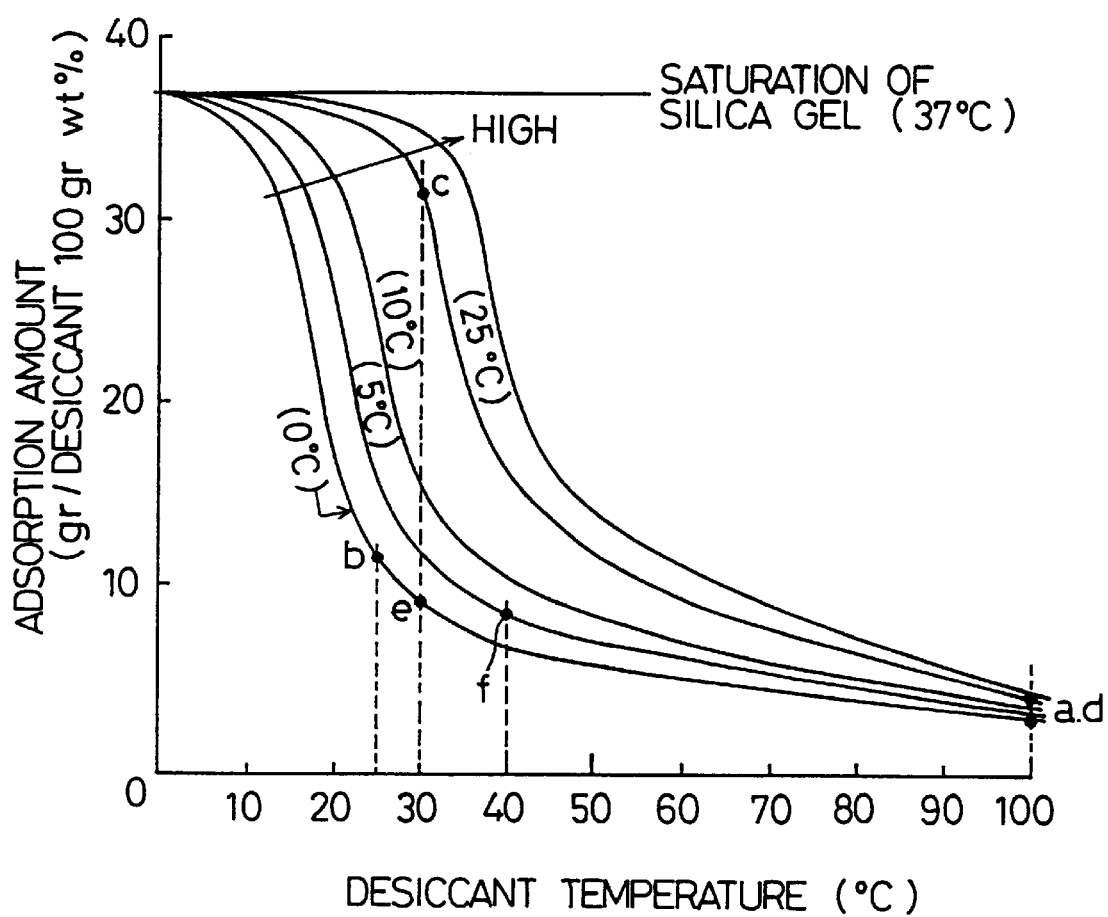
FIG. 13 is a graph showing the relationship between the temperature of desiccant and an adsorption amount.

FIG. 13 shows the characteristic of the adsorption amount of the desiccant 20 consisting of silica gel. FIG. 13 also shows each state (a) through (f) shown in FIGS. 7 through 12, respectively.

As shown in FIG. 13, the amount of moisture (ordinate) which can be adsorbed by the desiccant 20 is determined by the temperature in the desiccant tank 9 and the pressure of vapor (saturation temperature) in the water tank 10, and it has a characteristic of adsorption amount constant up to 37 wt %.

The states shown in FIGS. 7 through 12 are as indicated in the following Table.

| state | desiccant tank | water tank |
| --- | --- | --- |
| a | 100° C. | 25° C. |
| b | 25° C. | 0° C. |
| c | 30° C. | 25° C. |
| d | 100° C. | 25° C. |
| e | 30° C. | 0° C. |
| f | 40° C. | 25° C. |

Referring to FIG. 13, the cooling performance is obtained by the product of the variation of moisture from the state (b) to the state (c) and a latent heat amount, and the heating performance is the product of the variation of moisture from the state (e) to state (f) and the latent heat of condensation. When silica gel is used as the desiccant 20, the variation of moisture adsorption amount between the states (e) to (f) is small. Thus, a sufficient heating performance may not be obtained. In order to obtain a sufficient heating performance, zeolite can be used as the desiccant 20. If zeolite is used as the desiccant 20, chemisorption takes place. Therefore, the calorific value is great. That is, heat of about 1,000 kcal/kg is generated as a result of evaporation or condensation of moisture, as shown by an equation (1) shown below. It is however necessary to increase the capacity of the electric heater 26 because a temperature of 300° C. is required to desorb moisture.

$$H_2O \text{ (vapor)} \rightarrow H_2O \text{ (water)} + 1{,}000 \text{ kcal/kg} \quad (1)$$

As described above, in the cold/heat storage type air conditioning system 1 for air conditioning the interior of the car, the adsorption type air conditioning apparatus 4 stores cold or heat while the car is traveling, whereas during the stop of the car, it cools or heats the interior of the car by means of the heat obtained by the cold storage or the heat storage without using the main air conditioner 3. Accordingly, the cold/heat storage type air conditioning system 1 favorably air conditions a bed room of a truck or a rear seat of a station wagon.

Further, because no valves are mounted on the vapor refrigerant circuit 6, the vapor refrigerant circuit 6 has a small number of parts mounted thereon. Thus, the vapor refrigerant circuit 6 can be miniaturized and thus manufactured at a low cost. Thus, the compact adsorption type air conditioning apparatus 4 can be manufactured at a low cost.

In addition, the adsorption type air conditioning apparatus 4 cools or heats the interior of the car without operating the main air conditioner 3 during the stop of the car, thus reducing the fuel consumption rate. Further, the driver can have the interior of the car air conditioned without the car discharging exhaust gas to the outside or producing engine operation noise.

In the embodiment, zeolite or silica gel capable of adsorbing moisture is used as the adsorbent. In addition, activated carbon or activated alumina may be used as the adsorbent.

In the embodiment, alcohol or freon may be used as liquid refrigerant in addition to water.

Still further, the above-described embodiment may be modified in other ways without departing from the spirit of the present invention.

What is claimed is:

1. An adsorption type air conditioning apparatus comprising:
    a vapor refrigerant circuit mounted on vehicle and having an adsorbent tank accommodating adsorbent therein and a liquid refrigerant tank accommodating liquid refrigerant therein an connecting the adsorbent tank and the liquid refrigerant tank with each other, the vapor refrigerant circuit including a connection pipe connecting the adsorbent tank and the liquid refrigerant tank and maintaining two chambers of the tanks in continuous communication therethrough;
    an adsorbent heating means for heating the adsorbent accommodated in the adsorbent tank;
    an adsorbent tank-side ventilation duct provided in heat exchange relation with the adsorbent tank and switchingly connectable to a compartment interior and a compartment exterior of the vehicle;
    a liquid refrigerant tank-side ventilation duct connected in parallel with the adsorbent tank-side ventilation duct and provided in heat exchange relation with the liquid refrigerant tank said liquid refrigerant tank-side ventilation duct being switchingly connectable to the compartment interior and the compartment exterior of the vehicle;
    an adsorbent tankside air blowing means generating an air flow in the adsorbent tank-side ventilation duct;
    a liquid refrigerant tank-side air blowing means generating an air flow in the liquid refrigerant tank-side ventilation duct;
    an adsorbent tank-side path change-over means for switching a ventilation path of the adsorbent tank-side ventilation duct to one of an interior heat release operation path for supplying at least interior air to the compartment interior through the adsorbent tank-side ventilation duct and an exterior heat release operation path for discharging exterior air to the compartment exterior through the adsorbent tank-side ventilation duct; and
    a liquid refrigerant tank-side changer-over means for switching a ventilation path of the liquid refrigerant tank-side ventilation duct to one of an interior heat absorption operation path for supplying at least the interior air to the compartment interior through the liquid refrigerant tank-side ventilation duct and an exterior heat absorption/radiation operation path for exhausting the exterior air to the compartment exterior through the liquid refrigerant tank-side ventilation duct.

2. The adsorption type air conditioning apparatus according to claim 1, further comprising:
    an adsorbent tank-side main body case accomodating therein the adsorbent tank and the adsorbent tank-side ventilation duct and thermally insulating an outside and an inside thereof from each other; and
    a liquid refrigerant tank-side main body case accomodating therein the liquid refrigerant tank and the liquid refrigerant tank-side ventilation duct and thermally insulating an outside and an inside thereof from each other.

3. The adsorption type air conditioning apparatus according to claim 1, wherein:
    the adsorbent includes at least one of zeolite, silica gel, activated carbon and activated alumina; and
    the refrigerant includes at least one of water, alcohol and freon.

4. The adsorption type air conditioning apparatus according to claim 1, wherein:
    the adsorbent tank-side ventilation duct is formed to surround the adsorbent tank; and
    the liquid referigerant tank-side ventilation duct is formed to surround the liquid refrigerant tank.

5. The adsorption type air conditioning apparatus according to claim 1, wherein:
    the liquid refrigerant circuit includes a connection pipe connecting the adsorbent tank and the liquid referigerant tank and maintaining two chambers of the tanks in direct communication therethrough.

6. The adsorption type air conditioning apparatus according to claim 1, wherein:
    operational modes of the heating means, the two air blowing means and the two change over means are changeable electrically by a controller depending on operation of an engine-driven air conditioner of the vehicle.

7. The adsorption type air conditioning apparatus according to claim 6, wherein:
    each of the ventilation ducts has two inlets opening to the compartment exterior and the compartment interior, and two outlets opening to the compartment exterior and the compartment interior.

8. An air conditioning system for a vehicle having an engine comprising:
    an engine-driven air conditioning apparatus operated by the engine; and
    an electrically-driven air conditioner operated electrically and independently of operation of the engine and including,
    a vapor refrigerant circuit having an adsorbent tank accommodating adsorbent therein, a liquid refrigerant tank accommodating liquid refrigerant therein, and a connection pipe connecting the adsorbent tank and the liquid refrigerant tank in continuous direct communication therethrough,
    an adsorbent heating means for heating the adsorbent accommodated in the adsorbent tank,
    an adsorbent tank-side ventilation duct provided in theat exchange relation with the adsorbent tank,
    a liquid refrigerant tank-side ventilation duct connected in parallel with the adsorbent tank-side ventilation duct and provided in heat exchange relation with the liquid refrigerant tank, and
    control means having switches for storage instruction and air conditioning instruction to the electrically-driven air conditioner for electrically controlling the heating means and controlling each communication of the two ventilation ducts with an interior and exterior of the vehicle, the control means being capable of operating the electrically-driven air conditioner for cold storage and heat storage during operation of the engine-driven air conditioning apparatus and for air conditioning by the stored cold and heat after the engine-driven air conditioning apparatus is inoperative.

9. The air conditioning apparatus according to claim 8, wherein the electrically-driven air conditioner further includes:

an adsorbent tank-side air blowing means generating an air flow in the adsorbent tank-side ventilation duct, a liquid refrigerant tank-side air blowing means generating an air flow in the liquid refrigerant tank-side ventilation duct, an adsorbent tank-side path change-over means for switching a ventilation path of the adsorbent tank-side ventilation duct to one of an interior heat release operation path for supplying at least interior air to the interior of the vehicle through the adsorbent tank-side ventilation duct and an exterior heat release operation path for discharging exterior air to the exterior of the vehicle through the adsorbent tank-side ventilation duct, and a liquid refrigerant tank-side change-over means for switching a ventilation path of the liquid refrigerant tank-side ventilation duct to one of an interior heat absorption/radiation operation path for supplying at least the interior air to the interior of the vehicle through the liquid refrigerant tank-side ventilation duct and an exterior heat absorption/radiation operation path for exhausting the exterior air to the exterior of the vehicle through the liquid refrigerant tank-side ventilation duct.

10. An air conditioning method for a vehicle having an engine-driven air conditioner and an adsorption type air conditioner which includes a vapor refrigerant circuit having an adsorbent tank accommodating adsorbent therein, a liquid refrigerant tank accommodating liquid refrigerant therein and a pipe connecting the adsorbent tank and the liquid refrigerant tank, the method comprising the steps of:

operating the engine-driven air conditioner to provide conditioned air in a vehicle compartment while the vehicle runs;

operating the adsorption type air conditioner in a heat/cold storage mode to store therein heat/cold separately from engine operation while the vehicle runs; and operating the adsorption type air conditioner in an air conditioning mode to provide the stored heat/cold in the vehicle compartment after the vehicle stops.

* * * * *

UNITED STATES PATENT AND TRADEMARK OFFICE
CERTIFICATE OF CORRECTION

PATENT NO. : 5,768,908

DATED : June 23, 1998

INVENTOR(S) : Hisashi Tanaka et al

It is certified that error appears in the above-identified patent and that said Letters Patent is hereby corrected as shown below:

Col. 1, line 67, after "conditioning" insert --apparatus--

Col. 2, line 26, after "the" insert --car"

Col. 7, line 10, delete port" and substitute --ports-- therefor

Col. 8, line 20, delete "as" and substitute --at-- therefor

Col. 11, line 56, delete "release" and substitute --releases-- therefor

Col. 12, line 42, delete the 1st occurrence of "the"

Col. 12, line 39, delete "25°" and substitute --25° C-- therefor

Col. 12, line 54, delete "when"

Col. 13, line 48, delete "when"

Col. 15, line 16, claim 1, after "on" insert --a--

Col. 15, line 19, claim 1, delete "an" and substitute --and-- therefor

Col. 16, line 54, claim 8, delete "theat" and substitute --heat-- therefor

Signed and Sealed this

Seventeenth Day of November, 1998

Attest:

BRUCE LEHMAN

Attesting Officer        Commissioner of Patents and Trademarks